Feb. 15, 1927.

E. A. KING

TRAILER

Filed Oct. 17, 1919

INVENTOR
E. A. King
Victor J. Evans
Attorney

Feb. 15, 1927. 1,618,094
E. A. KING
TRAILER
Filed Oct. 17, 1919 2 Sheets-Sheet 2
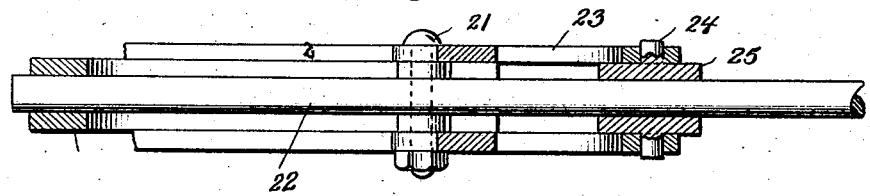
Fig. 3.
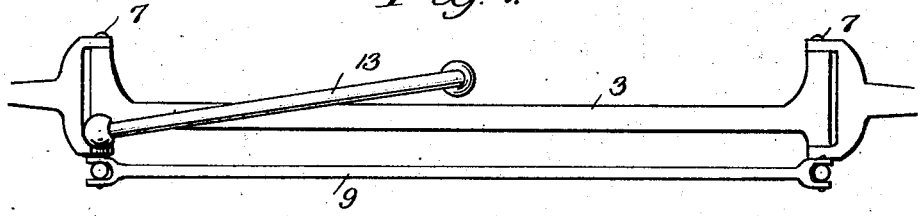
Fig. 4.
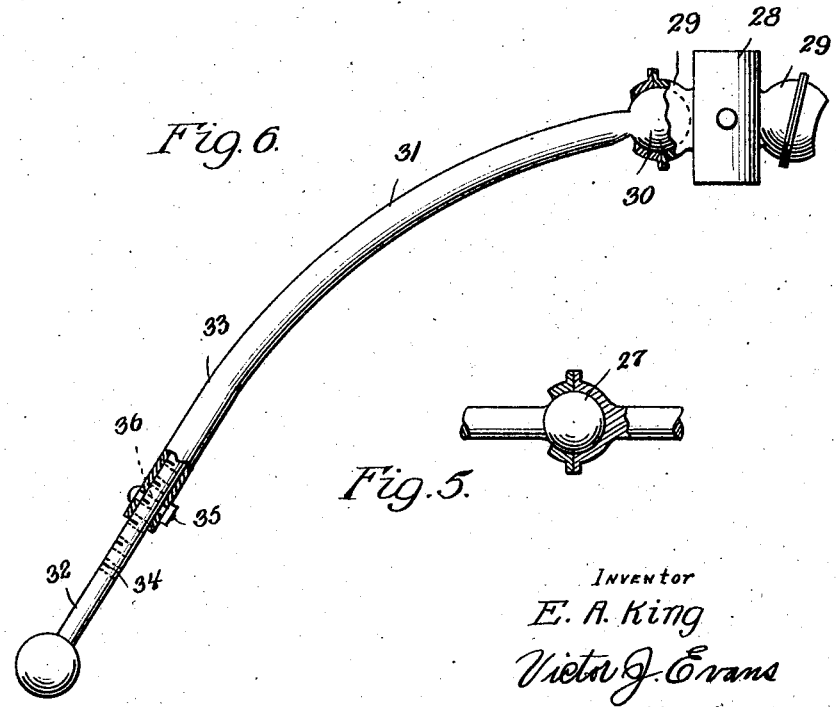
Fig. 6.
Fig. 5.
Inventor
E. A. King
Victor J. Evans
Attorney Patented Feb. 15, 1927.

1,618,094

UNITED STATES PATENT OFFICE.

EMORY A. KING, OF CORYDON, IOWA.

TRAILER.

Application filed October 17, 1919. Serial No. 331,292.

This invention relates to trailers and has for its primary object the construction of a trailer that will positively follow the track of the hauling vehicle, thereby preventing the tendency of the trailer to move to either side of its proper line of travel, which, when it takes place interferes materially with the efficient hauling of a trailer and more especially when there is more than one trailer.

The object of the invention is to accomplish a mechanical connection between the wheels of the trailer so that all of the wheels will be simultaneously inclined to a proper degree to follow the track of the vehicle ahead when making a turn.

A further object of the invention is to provide a rigid connection between the supporting wheels of a trailer, which in this particular case are pivoted, that will in no way interfere with the spring action of the body of the trailer.

Besides the above my invention is distinguished in the novel manner of connecting and associating the parts of my mechanism so that the guiding action of the wheels of each trailer may be regulated according to the position of the trailer in the train.

With these and other objects in view the invention will be better understood from the following detailed description taken in connection with the accompanying drawings wherein:

Fig. 3 is a sectional view of the actuator.

Fig. 4 is a view of the guiding means between each pair of wheels.

Fig. 5 is a detailed view of the ball and socket connection.

Fig. 6 is a detailed sectional view of a modified form of my invention.

Figure 1:
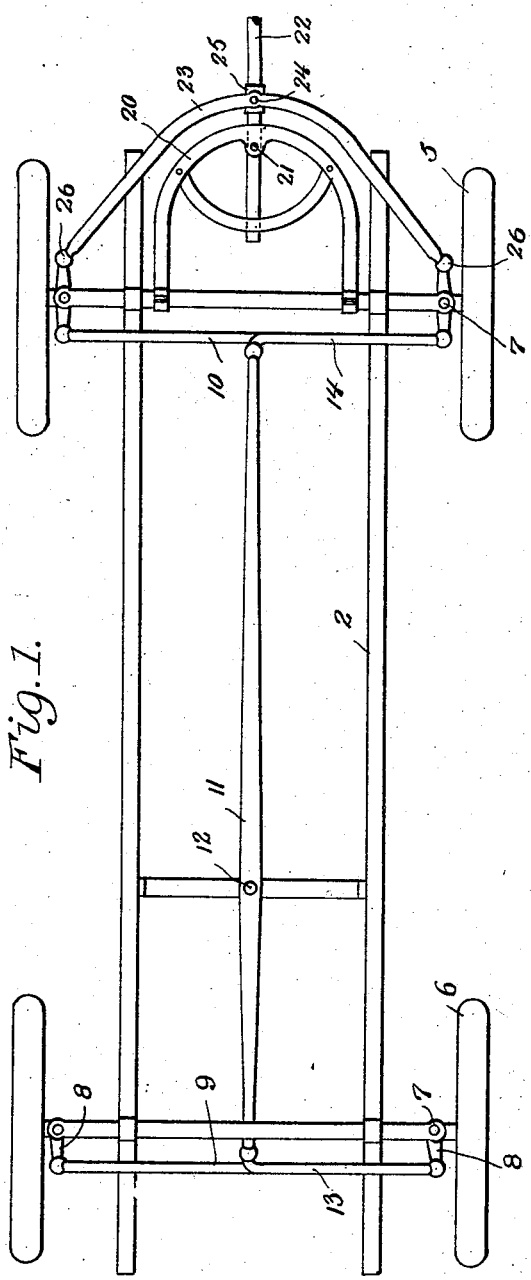
Fig. 1 is a bottom plan view of the chassis of a trailer constructed in accordance with my invention.
Figure 2:
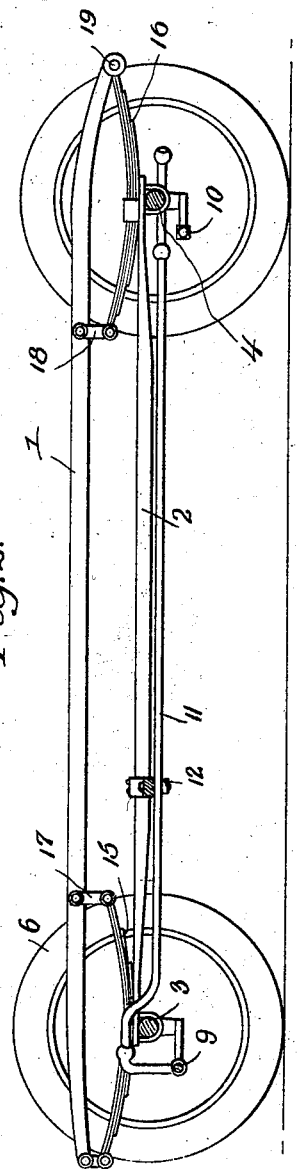
Fig. 2 is a longitudinal sectional view of the chassis.

Again referring to the drawings illustrating one of the many forms in which my invention may be constructed numeral #1 designates, a frame which corresponds to the ordinary frame of a motor vehicle, hereinafter to be known as the upper frame.

A lower frame 2 is fixed to the axles 3 and 4 of a front pair of wheels 5 and a rear pair of wheels 6.

By referring to Fig. 1 it will be noted that each wheel of each pair is pivotally connected to its axle as indicated at 7 so that the trailer may be guided in its travel. Knuckles 8 of the pivotal connection of the rear wheels are connected together by a rod 9 while a rod 10 similarly connects the pivots of the front wheels together. A lever 11 is pivotally connected to the frame 2 as indicated at 12 so as to swing in a horizontal plane. One end of this lever is flexibly connected by a link 13 with rod 9 while the remaining end is flexibly connected by a link 14 to the rod 10. Thus it will be seen that upon guiding movement of the front set of wheels this movement will be transmitted to the rear set of wheels through the lever 11. Attention is called to the fact that the degree of movement of the rear set of wheels with relation to the movement of the front set may be accurately regulated by positioning pivot 12. The upper frame which supports the body that carries the load is allowed the proper spring action by connecting the springs 15 and 16 in a manner now to be described.

The rear set of springs 15 each has its ends pivotally as well as displaceably connected to the upper frame by clips 17 while its intermediate portion is fixed to the frame 2. Each of the front springs 16 is fixed to the frame 2 and has one end pivotally and displaceably connected to frame 1 by a clip 18. The remaining end of the spring 16 has only a pivotal connection with the frame 1 as indicated at 19 with the result that the frame 1 may have the proper resilient movement without disturbing the fixed relation of the elements of my guiding mechanism.

For the purpose of giving automatic movement to the parts heretofore described in the travel of the vehicle to which the trailer is connected I provide the actuating means now to be described.

This actuating means consists of a frame 20 fixed to a stationary part of the trailer. Pivotally connected to this frame 20 as indicated at 21 is a tongue 22 which connects to the vehicle ahead. An actuator 23 has a pivotal connection 24 with a sleeve 25 slidingly mounted on the tongue and further has a ball and socket connection 26 with the pivots of the front set of wheels so that in the lateral swinging movement of the tongue due to the turn movement of the pulling vehicle the actuator 23 will turn the front wheels accordingly. The sleeve 25 is slidable on the tongue so as to compensate for the swinging movement of the tongue and the movement of the actuator 23.

As illustrated in Fig. 5 a ball and socket connection 27 will be used to accomplish the pivotal connection between the various parts. For instance the actuator may be constructed as illustrated in Fig. 6 in which I have illustrated the sleeve 28 as provided with sockets 29 for the reception of a ball 30 on each of the connecting members 31.

I have found out from practical demonstration of my invention that the throw of the front wheels of each trailer must be proportionately increased on each succeeding trailer from the hauling vehicle to insure the proper following of one trailer behind the other. One method of accomplishing this result is illustrated in Fig. 6 wherein I have shown the member 31 consisting of 2 parts 32 and 33 having a sliding connection with each other so as to be extended or collapsed for regulating the position of the sleeve with relation to pivot 21 thereby regulating the throw of the actuator. One of the parts may be provided with graduated marks 34 for determining the relative position of the parts. The parts 32 and 33 may be clamped in an adjusted position in any suitable manner such as by a bolt 35 cooperating with a plurality of openings 36 in one of the parts.

In concluding my description I wish to call attention to the fact that I do not desire to be limited to the exact construction of my mechanism illustrated in the drawings as the parts may be constructed in various other manners and associated in other relation and, therefore, I do not desire to be limited in any manner except as set forth in the claims hereunto appended.

Having thus described the invention, what I claim is—

1. In combination with a trailer including steering wheels mounted thereon, a tongue pivotally mounted for movement about a vertical axis, a sleeve slidable on the tongue, and operating connections between the sleeve and said wheels, said connections being adjustable in length to vary the position of the sleeve on the tongue relative to the pivot thereof.

2. In combination with a trailer including steering wheels mounted thereon, a tongue pivotally mounted for movement about a vertical axis, and wheel operating members operatively connected at their outer ends to the wheels and slidably connected at their inner ends to the tongue for movement longitudinally thereof, said members being adjustable in length to vary the point of connection between said tongue and the operating members relative to the pivot of the tongue.

In testimony whereof I affix my signature.

EMORY A. KING.